Feb. 13, 1951 C. W. HALEY 2,541,647
APPARATUS FOR STRIPPING WING FEATHERS
FROM FOWL AND THE LIKE
Filed April 11, 1949

INVENTOR
Charles Walter Haley
by Edward N. Fetherstonhaugh
ATTORNEY

Patented Feb. 13, 1951

2,541,647

UNITED STATES PATENT OFFICE 2,541,647

APPARATUS FOR STRIPPING WING FEATHERS FROM FOWL AND THE LIKE

Charles Walter Haley, Montreal, Quebec, Canada, assignor to McGruer, Fortier, Meyers, Limited, Montreal, Quebec, Canada Application April 11, 1949, Serial No. 86,646

1 Claim. (Cl. 17—11.1)

The invention relates to improvements in an apparatus for stripping wing feathers from fowl and the like, as described in the present specification and illustrated in the accompanying drawings that form a part of the same.

The invention consists essentially of the novel features in construction as pointed out broadly and specifically in the claims for novelty following a description containing an explanation in detail of an acceptable form of the invention.

The objects of the invention are to devise an effective means for removing the wing feathers from fowl and the like; to furnish a wing stripper for use in processing plants, in restaurants, hotels, on the farm, as well as in the home; to facilitate the preparing of fowl and the like for marketing or for storage in the plucked state; to make a wing feather stripper that takes up but little space, that is neat in appearance and safe in use; to construct a wing feather stripper of few and simple parts, easy to clean and requiring little or no maintenance; and generally to provide a wing feather stripper economical to manufacture and efficient in its use.

In the drawings.

Like numerals of reference indicate corresponding parts in the various figures.

Figures 1, 3:
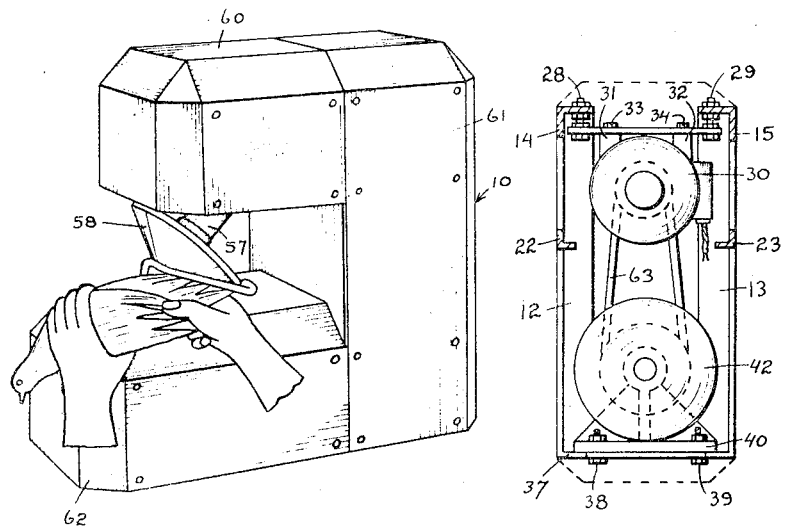
Figure 1 is a perspective view of the wing feather stripper in use.
Figure 3 is a sectional plan view as taken on the line 3—3 in Figure 2.
Figures 2, 4:
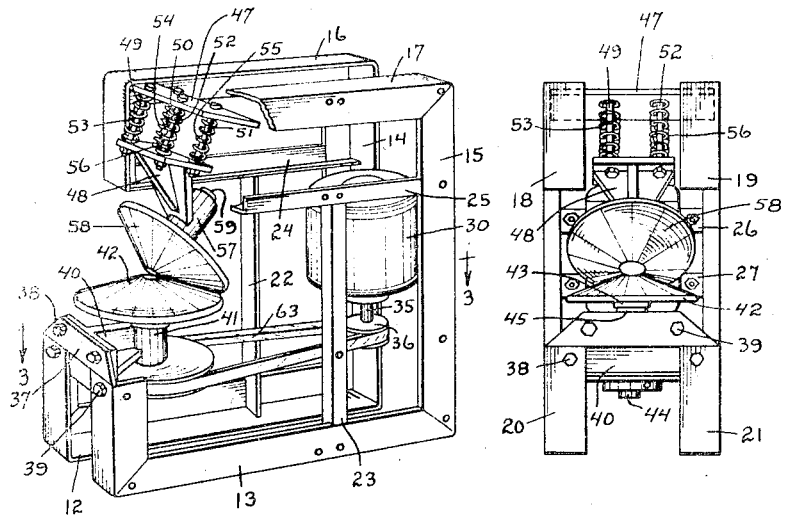
Figure 2 is a perspective view of the stripper with the covers removed and showing the operating parts.
Figure 4 is a front view of Figure 2.

Referring to the drawings, the wing stripper, as indicated by the numeral 10, is in the form of a unit made up of a frame-work, preferably comprised of a pair of spaced apart angle irons each identically fashioned to form longitudinal base members 12 and 13 extending into vertical rear members 14 and 15 and top members 16 and 17 extending horizontally forward from the top of the sections 14 and 15, these top bars or sections being shorter than the longitudinal base members 12 and 13 and having the front ends turned down to form vertical ends 18 and 19. The base members 12 and 13 are each turned up to provide the vertical front ends 20 and 21.

Each of the base sections has an upright, 22 and 23, suitably secured thereto towards the rear of the frame-work, and extending upward a predetermined distance where it is suitably and rigidly connected to a longitudinal member, 24 and 25, extending from the rear section of the frame-work to the vertical front end of the top section and rigidly secured to these members.

A pair of supports or bars, 26 and 27, extend across the rear of the frame-work connecting the rear sections 14 and 15 together and being secured to each of same by means of bolts 28 and 29. These supports are spaced apart, one above the other and form the mounting for a motor 30 positioned inside the frame-work, the mounting legs or lugs 31 and 32 on the motor engaging the mounting bars and being secured thereto by means of bolts 33 and 34, mounting the motor inside the frame-work above the bottom of same. Suitable connections lead from the motor, in this instance electric, to the power source, and a conventional type of starting and stopping switch is suitably located with respect to the motor.

A shaft 35 extends downward from the under side of the motor, being connected to and rotated by the same. A pulley or sheave 36 is fixedly secured to the outer end of this shaft 35.

A strap or cross-member 37 extends across the vertical front ends of the base members 12 and 13 on the top thereof and is rigid therewith, being welded or otherwise secured in position, and forming a mounting for a bracket assembly secured to the inside face of the same by bolts 38 and 39. This bracket assembly consists of a bearing bracket 40 and the bearing 41 vertically positioned on the bracket and integral with the same.

A truncated cone or bevelled member 42, having a downward extending boss 43 on its under side, is rotatably mounted on the vertical bearing 41; an axle or shaft 44 having one end extending up through the boss 43 and being fixedly secured therein mounts the lower cone 42 on the bearing, the axle extending down through the bearing and projecting beyond the lower end of same. A thrust washer 45 being located between the boss and the top edge of the bearing 41.

A second and larger pulley or sheave 46 is fixedly mounted to the projecting end of the shaft 44 of the cone to be rotatable therewith. An endless belt connects the driven sheave 46 to the driving sheave 36.

A mounting plate 47 extends between the top members 16 and 17 of the frame-work adjacent to the front end of the same, being rigidly secured to each member or formed integral therewith. This plate 47 is positioned to slant downward towards the rear of the frame-work. A bearing bracket 48 is located under the plate 47 parallel to same, being spaced apart therefrom and connected to the same by a plurality of bolts 49, 50, 51 and 52, each of the bolts having a compression spring, 53, 54, 55 and 56 respectively, secured thereto, the springs exerting a downward pressure at all times on the bracket 48.

The bearing bracket 48 is somewhat similar to that of the bracket 40, having the bearing 57, which bearing is positioned to slant upwardly, and forms a mounting for an upper truncated cone or bevelled member 58. This upper cone has a short shaft 59 fixedly secured thereto and extending through the bearing 57 to be rotatable therein. The upper cone is positioned by the bearing 57 so that a portion of its inner face abuts a portion of the inner face of the lower cone 42 at all times. The plate 47 and the bearing bracket are parallel to the abutting surfaces of the two cones. The springs exert downward pressure to the bracket 48 and hence on the upper cone 58, keeping the pair of cones always in abutment with one another, that is, holding the upper cone in frictional engagement with the lower cone.

Cover plates enclose the frame-work and are removable therefrom. These cover sections 60, 61 and 62 are secured to the frame-work, to the top horizontal section, the vertical rear section and the base respectively, by means of bolts or screws engaging holes suitably located in the frame-work, and enclosing all but the pair of cones.

In the operation of the wing feather stripper, the motor is started, rotating the shaft 35 which in turn rotates the sheave 36, the belt 63 rotating the sheave 46. The driven sheave 46 rotates the axle of the lower cone 42 to rotate the same, this lower cone in turn rotates the abutting upper or driven cone. A person, to remove the wing feathers from a fowl or other bird, merely holds the bird in position so that the wing feathers are placed between the cones, the edge of the feathers being caught at the point of abutment of the cones and the revolving cones effecting a pull on the feathers and stripping them from the wing.

It is of course understood that modifications and ramifications may be made without in any way departing from the spirit of the invention as hereinabove described and illustrated, particularly as regards the shape, form or construction of the actual stripping members 42 and 58. While the preferred type of members has been hereinabove described and illustrated, namely, truncated cones, a flat disc and a cone may be used, cones of various angles and sizes; and also, a number of cones could be used.

What I claim is:

In an apparatus for stripping wing feathers from fowl and the like, a unit comprising a frame-work consisting of a pair of spaced apart angle irons fashioned to form longitudinal base members, vertical rear members and top members being joined by said pair of spaced apart vertical irons, said top members extending horizontally forward from the top of the vertical and rear members and being shorter than said longitudinal base members and having the front ends thereof turned down to form vertical ends, said base members being turned up to form vertical front ends, upright portions extending upward from said base and being secured thereto towards the rear thereof, a longitudinal member forming part of said frame-work, a pair of support bars extending across the rear of said frame-work and connecting the rear sections thereof toward one another, a pair of spaced apart mounting bars secured to said vertical rear sections, a motor located within said frame-work and secured to said mounting bars above the base thereof, a shaft connected to said motor and being rotated thereby, a driving sheave secured on said shaft, vertical front sections formed from the longitudinal base portion of said frame-work, a bracket fixedly secured at the top of said vertical front sections, a truncated cone, an axle secured to the underside of said truncated cone and extending downward therefrom, a driven sheave fixedly mounted on the projecting end of said axle and a belt connecting said driving sheave to said driven sheave, a mounting plate on said frame-work, a bracket positioned below said mounting plate and being free from said frame-work, compression springs suitably mounted to said bracket and effecting a downward pressure thereon, and said bracket being positioned in a horizontally inclined position, a second truncated cone being suitably supported and rotatable with respect to said frame-work and abutting a portion of said first truncated cone, said compression springs holding each of said truncated cones adjacent and in contact with one another thereby providing a frictional engagement for plucking feathers and the like.

CHARLES WALTER HALEY.

REFERENCES CITED

The following references are of record in the file of this patent:

UNITED STATES PATENTS

| Number | Name | Date |
| --- | --- | --- |
| 1,431,649 | Gillette | Oct. 10, 1922 |
| 1,629,452 | Dennis | May 17, 1927 |
| 2,004,581 | Meyer | June 11, 1935 |
| 2,112,230 | Fisher | Mar. 29, 1938 |